United States Patent [19]
Frankel et al.

[11] Patent Number: 6,075,784
[45] Date of Patent: Jun. 13, 2000

[54] SYSTEM AND METHOD FOR COMMUNICATING VOICE AND DATA OVER A LOCAL PACKET NETWORK

[75] Inventors: David P. Frankel; Joe Boucher, both of Sunnyvale; Kenneth M. Kolderup, San Mateo, all of Calif.

[73] Assignee: Jetstream Communications, Inc., San Jose, Calif.

[21] Appl. No.: 09/112,911

[22] Filed: Jul. 9, 1998

Related U.S. Application Data

[60] Provisional application No. 60/088,399, Jun. 9, 1998.

[51] Int. Cl.⁷ .................................................. H04L 12/66
[52] U.S. Cl. ........................................ 370/356; 370/352
[58] Field of Search .................................. 370/352, 353, 370/354, 356, 355, 466, 467; 455/3.1, 3.2, 3.3, 4.1, 4.2, 5.1, 6.3; 379/88.17; 348/6, 7, 8, 12, 13, 14, 15, 16

[56] References Cited

U.S. PATENT DOCUMENTS

| | | |
|---|---|---|
| 4,100,377 | 7/1978 | Flanagan . |
| 4,740,955 | 4/1988 | Litterer et al. . |
| 5,386,417 | 1/1995 | Daugherty et al. ............ 370/352 |
| 5,392,280 | 2/1995 | Zheng . |
| 5,526,353 | 6/1996 | Henley et al. . |
| 5,534,912 | 7/1996 | Kostreski ........................ 455/4.2 |
| 5,604,737 | 2/1997 | Iwami et al. . |
| 5,613,190 | 3/1997 | Hylton ............................ 455/4.2 |
| 5,742,596 | 4/1998 | Baratz et al. . |

OTHER PUBLICATIONS

*Pots Splitter* Alcatel Network Systems, Inc. and Compagnie Financiere Alcatel, 1998, (1 page).
*Alcatel 1000 ADSL System Overview* Alcatel Network Systems, Inc. and Compagnie Financiere Alcatel, 1998, (2 pages).
*Homeworx™ Access Platform* ADC Telecommunications, Inc., Nov., 1997, (6 pages).
*Homeworx™ Access Platform Telephone System* ADC Telecommunications, Inc., Nov., 1997, (8 pages).
*Bundling Telecommunications Services: Differentiating through value–added services now and tomorrow*, Josh Soske, VINA Technologies, 1998, (2 pages).
*The Bundled Services Solution* VINA Technologies, 1998, (2 pages).
*Infrastructure for DSL Solutions*, Mark Emery, AG Communication Systems, 1997, (10 pages).
*Voice and Data Integration—Network Consolidation Options* Vienna Systems, Apr. 21, 1998, (7 pages).
*Voice and Video on the LAN* Vienna Systems, Apr. 21, 1998, (4 pages).
*Real–Time Voice Over Packet–Switched Networks*, Kostas et al., IEEE Network, Jan./Feb., 1998, pp. 18–27.

*Primary Examiner*—Huy D. Vu
*Attorney, Agent, or Firm*—Needle & Rosenberg, P.C.

[57] ABSTRACT

A system and method of communicating voice and data via a local packet network (LPN) to and from a customer site. A remote digital terminal (RDT) is provided at a customer site to interface a plurality of telephone devices and/or data devices (computers or a local area network of computers) with the LPN via a local loop link, such as a Digital Subscriber Line or a wireless local loop. A host digital terminal (HDT) is provided at a control site within or connected to the LPN that coordinates the communication of voice calls between the RDT and a public switched telephone network (PSTN) switch via the LPN and that coordinates the communication of data between the RDT and a data network within or without the LPN. Multiple telephone calls with the customer site can be supported by the remote digital terminal over a single local loop link connected to the LPN. In addition, the HDT can support communication with multiple RDTs.

26 Claims, 6 Drawing Sheets

SYSTEM AND METHOD FOR COMMUNICATING VOICE AND DATA OVER A LOCAL PACKET NETWORK

This application claims priority to U.S. Provisional Application, No.60/088,399, filed Jun. 8, 1998.

FIELD OF THE INVENTION

The present invention is directed to a system and method for providing voice and data services over an access network supporting a digital packet-based transport protocol, such as Digital Subscriber Line (DSL) technology.

BACKGROUND OF THE INVENTION

The Telecommunications Act of 1996 officially opened the local telecommunications market in the United States to competition. Prior to 1996, the Regional Bell Operating Companies (RBOCs) held monopolies on local telephone service within their regions. As a result of the Act, the RBOCs were designated Incumbent Local Exchange Carriers (ILECs) and companies competing with the ILECs are referred to as Competitive Local Exchange Carriers (CLECs). To date, states have registered hundreds of new and established companies as CLECs, and some are now offering competitive local service. CLECs offering local service can choose from two basic network strategies for providing service. A CLEC can purchase its own switching and transmission equipment and build a local telecommunications network alongside the ILEC network. CLECs following this strategy are referred to as facilities-based CLECs. Alternatively, the Telecommunications Act of 1996 made provisions for CLECs to rebrand and resell ILEC services purchased at a discount. CLECs following this strategy are referred to as resale CLECs. In some cases, a CLEC will pursue both strategies.

Although many CLECs initially pursued a resale network model, most are now exclusively focused on providing facilities-based local service. The resale model had initial appeal because it enabled a CLEC to quickly offer a broad array of services to both business and consumer customers in many geographic markets with little initial capital investment. However, the profit margins from resale proved inadequate as a viable long-term business strategy.

There are two major components to a local telecommunications network, the switching (or core) network and the access network. As an oversimplification, the switching network provides the service while the access network transports the service to the customer. For an ILEC, multimillion dollar digital switches located in every community in a geographic market constitute the switching network, while the thousands of pairs of copper wires that run from each ILEC central office (CO) to customer premises constitute the access network.

CLECs, however, demand local networks that are very different from those used by ILECs. The CLECs do not need, nor could they afford, to immediately build-out decentralized switching networks to service every potential subscriber in a market. Therefore, CLECs choose to centralize their switching systems, using one or two digital switches to service an entire market. However, while a centralized switching strategy is more efficient and less expensive, it presents a challenge to design an access network capable of serving a small, geographically dispersed customer base. An access network must accommodate the increased distance between the switching equipment and each customer site. As an added challenge, most CLECs intend to offer local telephone service and data services, such as high speed Internet access. Consequently, CLECs need access networks that are capable of delivering both voice and data services to avoid the complexity and expense of constructing separate voice and data access networks. To meet these challenges, most CLECs are turning to broadband access networks: access networks that enable a high bandwidth connection to be established between the CLECs centralized facility and remote customer sites. Transmission equipment is now available that can enable a CLEC to deliver voice and data services over several of these new broadband access networks.

Broadband access networks generally consist of two components. The first is called the backbone network that connects the centralized switching equipment of a CLEC to a centralized location within each community, such as the ILEC central office. The backbone portion of a CLEC broadband access network is usually a fiber optic network, such as one that conforms to the Synchronous Optical Network (SONET) standard. The second component is called the "last mile" network and is the connection from the community location to each customer site. There are a variety of broadband technologies available for the last mile portion, and the one selected for use by a CLEC can greatly affect the capital investment required to serve a community. The last mile broadband access technologies currently available for use in access networks by CLECs are Fiber-to-the-Building (FTTB), Hybrid Fiber/Coax (HFC), Wireless Local Loop (WLL) and Digital Subscriber Line (DSL).

Traditionally, telephone subscribers have been connected to the Public Switched Telephone Network (PSTN) through a last mile network that physically consists of a pair of copper wires running between a subscriber (home or office) and the "wire center" of the telephone company. The wire center typically serves thousands, or even tens of thousands, of subscribers in a neighborhood or community, and houses a "central office switch" that terminates each subscriber wire pair. The switch controls the telephone at each subscriber site, providing power, ringing, and audio signals in analog form over the wire pair. The switch also detects when a subscriber line goes "off hook," dials digits, etc., and in response routes and connects calls to other subscribers or to other switches in the PSTN. This in summary is known as the "Plain Old Telephone Service" (POTS) and is an analog technology (as opposed to digital technology).

Subscribers requiring more than a single telephone "line" can be served by installing the corresponding number of POTS circuits using multiple copper wire pairs. Alternatively, a "pair gain" system can be deployed, which multiplexes the signals for several telephone lines onto a single pair of wires. This is accomplished with special equipment at each end of the copper pair. The pair gain equipment converts a POTS analog signal into a digital format, usually at 64 kilobits per second. A digital connection is established over the copper pair, with sufficient bandwidth to carry all of the required bit streams. Time-division multiplexing is used to merge the bit streams. A typical pair gain arrangement is a "T-1" line, operating at 1.536 mega-bits per second (Mbps), allowing it to carry 24 individual 64 kilobit/second channels or streams. At a subscriber location, special equipment converts each of the 24 streams to and from a format of conventional POTS signals. At the wire center, similar equipment is required.

The T-1 technology is not always more economical than utilizing the existing infrastructure of the POTS system because T-1 service requires deployment of a significant amount of special equipment and infrastructure. Moreover, if a subscriber requires less than 24 lines of service, the T-1 solution is even less attractive because the equipment cost is spread over fewer lines. At the central office switch, a T-1 line is terminated by the special port that is dedicated to that subscriber, even if only a fraction of the 24 channels are used by that subscriber.

DSL is a high bandwidth technology that enables data to be transferred to and from individual subscriber locations at various speeds, currently ranging as high as 2 Mbps. Data is transferred over a DSL access portion of a local packet network (LPN) as "packets," and packets move over the LPN only when information is moving to or from the subscriber, and the line is in an idle condition otherwise. An LPN is a network that provides data connections among subscribers in a local service area with various connection types and data rates. Typically, an LPN consists of a plurality of DSL multiplexers and data switches. DSL equipment is designed to serve large numbers of subscribers, resulting in relatively low per-subscriber costs.

DSL technology stands out as being the most attractive to a CLEC in terms of up front capital investment. FTTB, HFC and WLL broadband access technologies each require the installation of significant infrastructure (fiber optic cables, coaxial cables, base stations and repeaters, etc.) which is not economical for a CLEC to service a decentralized small or medium-sized business customer base. DSL runs over existing copper last mile networks (local loops) of the ILECs and therefore does not require significant capital expenditures for deployment. Instead, the CLEC pays a monthly fee to the ILEC for each of the local loops that it uses. In addition, DSL has the correct capacity for serving residential through medium-size business markets.

In general, the DSL access portion of a local packet network does not carry voice and is not connected to the central office switch. However, some implementations of DSL can combine, on a single wire pair, both the digital signal carrying data packets, and a single POTS signal carrying analog voice. This permits a DSL subscriber to use the line for a telephone call while simultaneously transferring packet data. However, this approach is limited to a single POTS signal, and requires POTS compatible equipment to terminate the line at the wire center, in addition to the packet-oriented DSL equipment.

It is desirable to provide a system that enables facilities-based full service CLECs to transport local telephone service, including multiple voice call service, and data services to small and medium-sized business customers over an access network that supports a digital packet-based transport protocol, preferably over existing copper wire pair lines. It is further desirable that the system use the fewest number of local loops, and that a minimum amount of CLEC equipment be required at the ILEC wire center.

SUMMARY OF THE INVENTION

Briefly, the present invention is directed to a system and method for utilizing a local packet network (LPN) that supports a digital packet-based transport architecture, such as Digital Subscriber Line (DSL), to provide voice and optionally data services over a single local loop, such as a DSL, to a customer site. Multiple voice telephone calls as well as data services for a customer site are supported on a single DSL connected to that customer site.

At a customer site, a plurality of telephone devices (such as telephones, facsimile machines, modems and/or office telephone system ports) and data devices (such as those connected by a local area network) are interfaces to a local loop link connected to the LPN. Analog telephone signals (representing voice, facsimile signals, or modem signals) received from the plurality of telephone devices are converted to digital voice-band packets. Control signals representing off-hook, dial tone, call setup information, and other call control signals are converted to digital call control packets. The voice-band packets, call control packets and data packets (from the data devices at the customer site) are modulated for transmission via the local loop link over the LPN. In the reverse direction, modulated voice-band packets, data packets and call control packets received from the LPN destined for the customer site via the LPN on the local loop link are demodulated. The demodulated voice-band packets are converted to analog telephone signals for connection to appropriate ones of the plurality of telephone devices at the customer site. The demodulated data packets are coupled to the data devices (in the local area network) at the customer site. The demodulated call control packets are processed to control call setup and maintenance functions at the customer site.

At a control site within or connected to the LPN (such as a central switching facility), voice-band packets, call control packets and data packets from the customer site are received via the LPN. The voice-band packets received from the customer site via the LPN are converted to time-division multiplexed signals and are coupled to a public switched telephone network (PSTN) switch in assigned time slots. Data packets received from the customer site are coupled to a data switch for transfer to a data network (such as the Internet). The call control packets are processed to control call setup and maintenance functions at the control site. In the reverse direction, data packets destined for the customer site are received from the data switch and coupled to the LPN for transmission to the customer site. Time-division multiplexed voice signals received from the PSTN switch destined for the customer site are converted to voice-band packets and are coupled to the LPN for transmission to the customer site.

According to the present invention, a specialized apparatus called a remote digital terminal (RDT) is provided at the customer site and another specialized apparatus, called a host digital terminal (HDT) is provided at the central switching facility. Alternatively, the specialized functions of the HDT are integrated into a data switch in the LPN or into a PSTN switch. Similarly, the functions of the RDT can be integrated into a key telephone system/private branch exchange device or other equipment at the customer site. The RDT and HDT transport digitized voice-band packets and data packets between each other via the LPN. The RDT converts the voice-band packets suitable for communication over the LPN to and from analog telephone signals suitable for use by attached telephone devices. Similarly, the HDT converts voice-band packets to and from a time-division multiplexed format suitable for communication via the PSTN switch.

The above and other objects and advantages of the present invention will become more readily apparent when reference is made to the following description, taken in conjunction with the accompanying drawings.

DETAILED DESCRIPTION OF THE INVENTION

Figure 1:
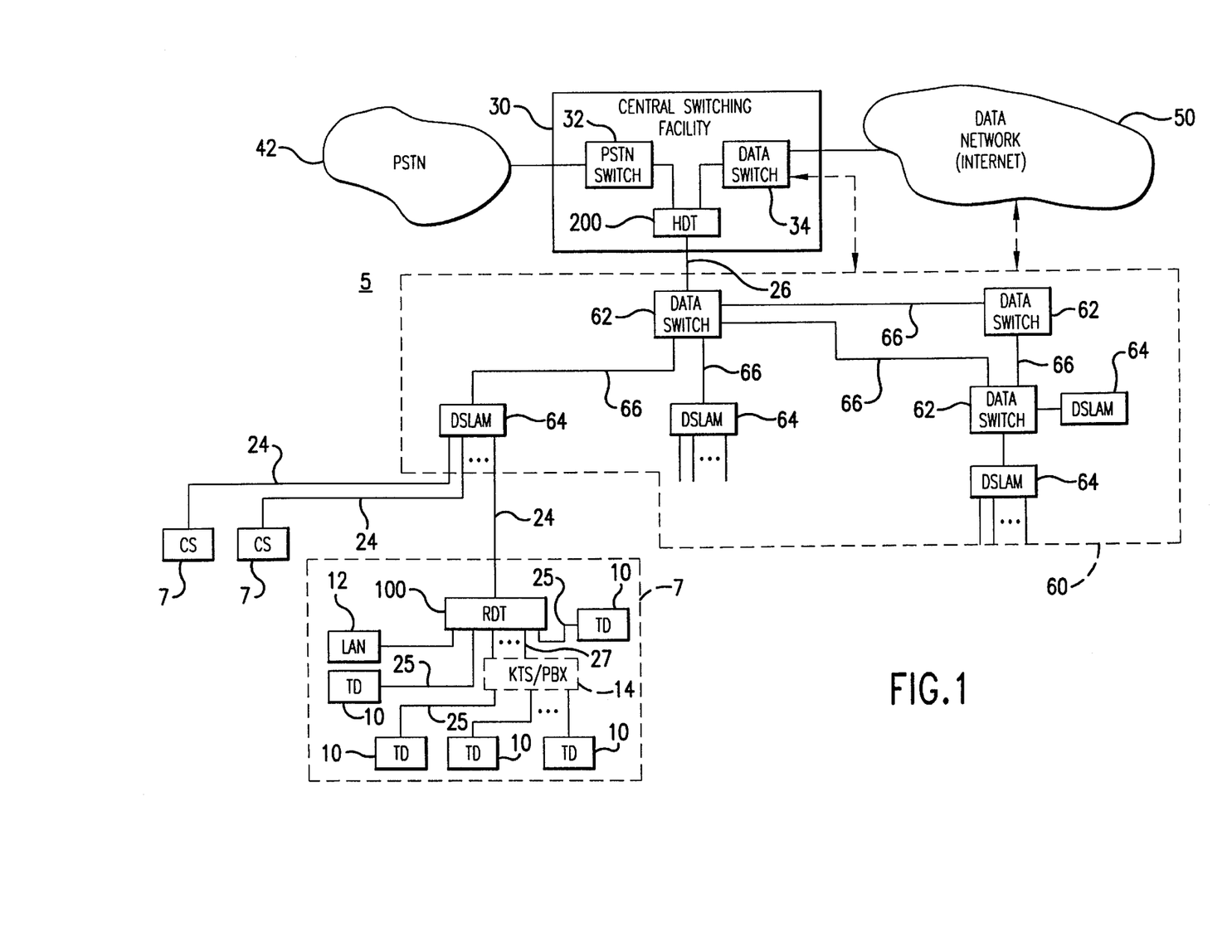
FIG. 1 is a block diagram of a telecommunication system employing the remote digital terminal and host control terminal of the system and method according to the present invention.

FIG. 1 is a general diagram of a system 5 that enables a facilities-based full service CLEC to transport local telephone service and data services to small and medium-sized businesses. The present invention is described as being useful in utilizing a particular type of local loop link, called the DSL network. However, it should be understood that the teachings described herein are applicable to any access network supporting a digital packet-based transport protocol. DSL is only an example of such a protocol-access network technology.

The primary components of the system according to the present invention are a remote digital terminal (RDT) 100 and a host digital terminal (HDT) 200. The RDT 100 resides at a customer (subscriber) site shown at reference numeral 7 and interfaces a plurality of telephone devices (TDs) 10 and, optionally, a local area network (LAN) 12 to a local loop link, such as a line supporting the Digital Subscriber Line (DSL) transport protocol. For simplicity, the local loop link is referred to as a DSL 24. Other local loop links that may be suitable for use in conjunction with the present invention are wireless local loops, such as digital cellular local loops, and the like.

The DSL 24 is an access network of a local packet network (LPN) 60. The LPN 60 comprises one or more data switches 62, such as Asynchronous Transfer Mode (ATM) switches, and one or more DSL access multiplexers (DSLAMs) 64. The data switches 62 consist of one or more processors controlled by software. The data switches 62 are connected to each other and to DSLAMs 64 preferably via optical links, such as synchronous optical network (SONET) facilities 66. In each ILEC central office (CO), there is a DSLAM 64 that controls the distribution (and collection) of signals to and from a plurality of DSLs 24. The combination of DSLAMs 64 and data switches 62 make up the LPN 60.

The LPN 60 provides data connections among subscribers in a local service area with various connection types and data rates. For example, the LPN might include DSL connections at rates ranging from 256 Kbps to 6 Mbps used by homes and small businesses, T3 connections at 45 Mbps used by large business and small Internet Service Provides (ISPs) and OC-3 connections for use by the largest businesses and ISPs.

Returning to the description of a customer site 7, the TDs 10 may connect directly to the RDT 100 or to a key telephone system/private branch exchange (KTS/PBX) device 14 that is connected to the RDT 100. Connections between the RDT 100 and the associated TDs are by standard analog telephone lines 25, or alternatively by other standard telephony interfaces such as T-1, ISDN, etc. Connections between the RDT 100 and the KTS/PBX 14 is by way of a plurality of trunks 27. The function of the RDT 100 is to allow voice traffic associated with one or more TDs 10 and data traffic from the LAN 12, if any, to be converted to and from a format that can transit the LPN 60. It should be understood that the voice-band traffic associated with the TDs 10 could be voice, modulated digital data from a modem, facsimile machine, and possibly certain call control signals (such as dial tone, busy signal, etc.). Data traffic is that traffic associated with the LAN 12 or other data-packet based devices at the customer site 7.

As is well known in the art, DSL is a telecommunication technology that enables data to be transferred from individual subscriber locations at various speeds, currently as high as 2 Mbps using the existing twisted wire pair line infrastructure already in place in most industrialized parts of the United States and the world. That is, the DSL 24 is a standard twisted wire pair line that is used to transmit information that is formatted in accordance with the DSL transport protocol.

The HDT 200 resides at control site within or without the LPN 60. For example, FIG. 1 shows the HDT residing at a CLEC switch facility 30 and interfaces a PSTN switch 32 and a data switch 34 to the fiber backbone of the LPN 60. The PSTN switch 32 may route voice calls to the local PSTN 42 or to a long distance network. The data switch 34 may route data packets to and from a data network 50, such as the Internet. The HDT 200 links via an optical fiber 26 or another facility connected to the LPN 60. The CLEC 30 switching facility is also hereinafter referred to as a central switching facility. Both the data switch 34 in the central switching facility 30 and the data network 50 may route data directly to the LPN 60, bypassing the HDT 200. Similarly, a data switch 62 in the LPN 60 may directly route data to the data network 50.

Alternatively, the functions of the HDT 200 may be incorporated into a control site at another location in the system. For example, the functions of the HDT may be incorporated into a data switch 62 of the LPN 60 rather than be performed by a separate unit. Software that carries out the functions of the HDT 200 (described hereinafter) may be provided in the data switch 62 to be executed by the processor(s) in the data switch 62. The software in the data switch 62 can be enhanced to perform the functions of the HDT 200 and interface directly to the PSTN switch 32, to the data switch 34 or to the data network 50. Similarly, the software may be provided in a PSTN switch 32 to be executed by processors associated with the PSTN switch 32.

Figure 2:
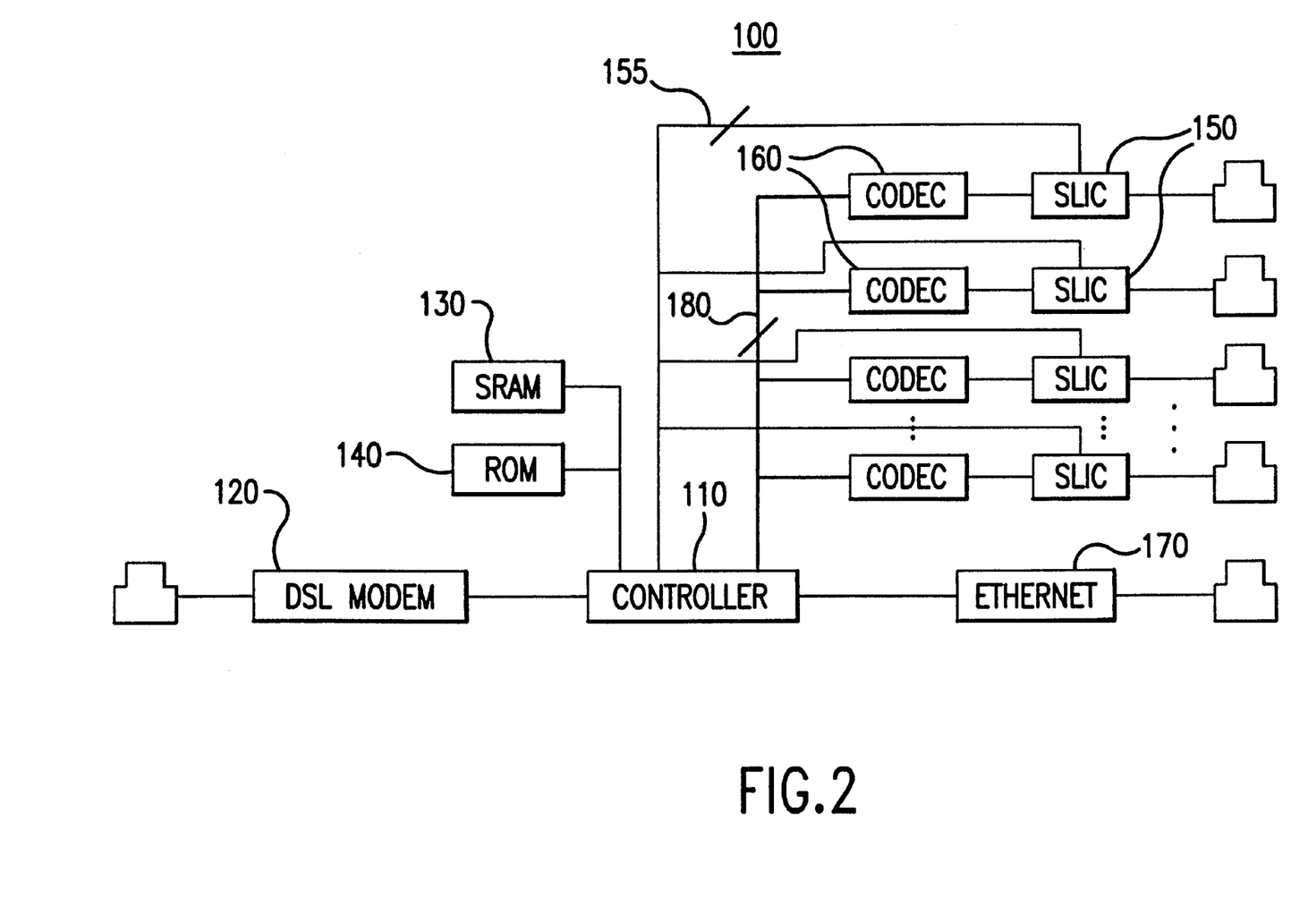
FIG. 2 is a block diagram of a remote digital terminal according to the present invention.

Turning to FIG. 2, with continued reference to FIG. 1, the components of the RDT 100 will be described. In a preferred embodiment, the RDT 100 is embodied as circuit board housed in a suitable enclosure with a power supply.

Specifically, according to a preferred embodiment, the RDT 100 comprises a controller 110, a DSL modem 120, a static random access memory (SRAM) 130 for buffering working data, a read only memory (ROM) 140 that stores a software program for the controller 110, a plurality of subscriber line interface circuits (SLICs) 150, a plurality of coder/decoders (CODECs) 160, and an Ethernet interface 170.

The DSL modem 120 connects directly to the DSL 24. The DSL modem performs the modulation and demodulation necessary to transport information via the DSL 24 into the LPN 60. There are several modulation/demodulation formats that are known in the art for use over a DSL 24. The DSL modem 120 also formats the modulated information into a suitable packet format, such as the asynchronous transfer mode (ATM) protocol for example, that is utilized by the equipment in the LPN 60 for the transport of information. Alternatively, if the local loop link is a wireless local loop link, the modem 120 would be a wireless modem capable of performing the modulation and demodulation necessary for transporting information via a wireless link. In addition, a transceiver (not shown) would be connected to the model 120 to wirelessly transmit and receive the modulated information.

The controller 110 is connected to the DSL modem 120, the SRAM 130, ROM 140, Ethernet interface 170 and a time division multiplex (TDM) bus 180. Furthermore, the controller is connected to each of the SLICs 150 by a control bus 155 to enable the controller 110 to detect when a TD 10 goes off-hook and to command an SLIC 150 to ring a TD 10. Each SLIC 150 is connected to a TD 10 or to a PBX/KTS 14 by a standard analog telephone line. The SLIC 150 provides the precise voltages and currents required to interface to telephone devices, such as standard telephone sets, facsimile machines, etc. The CODEC 160 is a coder/decoder that converts analog telephone signals (voice and other in-band telephone signals) to digital bit streams, and converts digital bit streams to analog telephone signals. The controller 110 is connected to each of the CODECs 160 by the TDM bus 180. The number of TDs 10 services by the RDT 100 will determine the number of SLICs 150 and CODECs 160 required. However, as will be explained hereinafter, the number of telephone devices that may be in use at any one time depends on the bandwidth of the local loop link. The Ethernet interface 170 is a standard network interface circuit device that interfaces digital data between an attached PC or LAN 12.

The controller 110 is preferably a microprocessor that operates in accordance with software stored in the ROM 140. The operation of the controller 110 may be updated or modified by employing a reprogrammable non-volatile ROM, such as a "flash" memory, that is well known in the art. The controller 110, under control of the software program stored in the ROM 140, performs two major functions: call set-up control and voice-band data conversion.

As an alternative to the implementation shown in FIG. 2, the RDT 100 may be implemented using a PC with plug-in cards that provide the necessary interfaces (DSL, telephone, and Ethernet). Still another alternative is to provide a server computer that provides the call control functionality to a plurality of multimedia client PCs each having plug-in telephony and sound cards so that each PC can support a telephone call. Yet another alternative is to implement the functions of the controller 110 by a digital signal processor (DSP) or an application specific integrated circuit (ASIC).

Furthermore, rather than providing a plurality of individual SLICs 150, a single subscriber line interface unit capable of coupling a plurality of signals to and from a plurality of telephone devices may be employed. Similarly, a single voice conversion device having the processing capability to perform multiple conversions may be used in place of the plurality of separate CODECs 160.

The function of the RDT 100 is to allow traffic associated with one or more telephone calls to be converted to and from a form that can transit the LPN 60. More specifically, the functions of the RDT 100 include interfacing to a local loop link, such as a DSL (via an integrated or external DSL modem); converting voice-band packets to and from conventional analog telephone signals; converting data packets to and from a format suitable for transport via the LPN; processing call control functions (ringing, on-hook, and off-hook functions) to generate and detect call control packets sent or received via the LPN; providing an electrical interface to conventional telephone equipment; managing the sharing/allocation of the bandwidth on the local loop link with other (non-telephony) functions; and providing remote management and maintenance functions.

Figure 3:
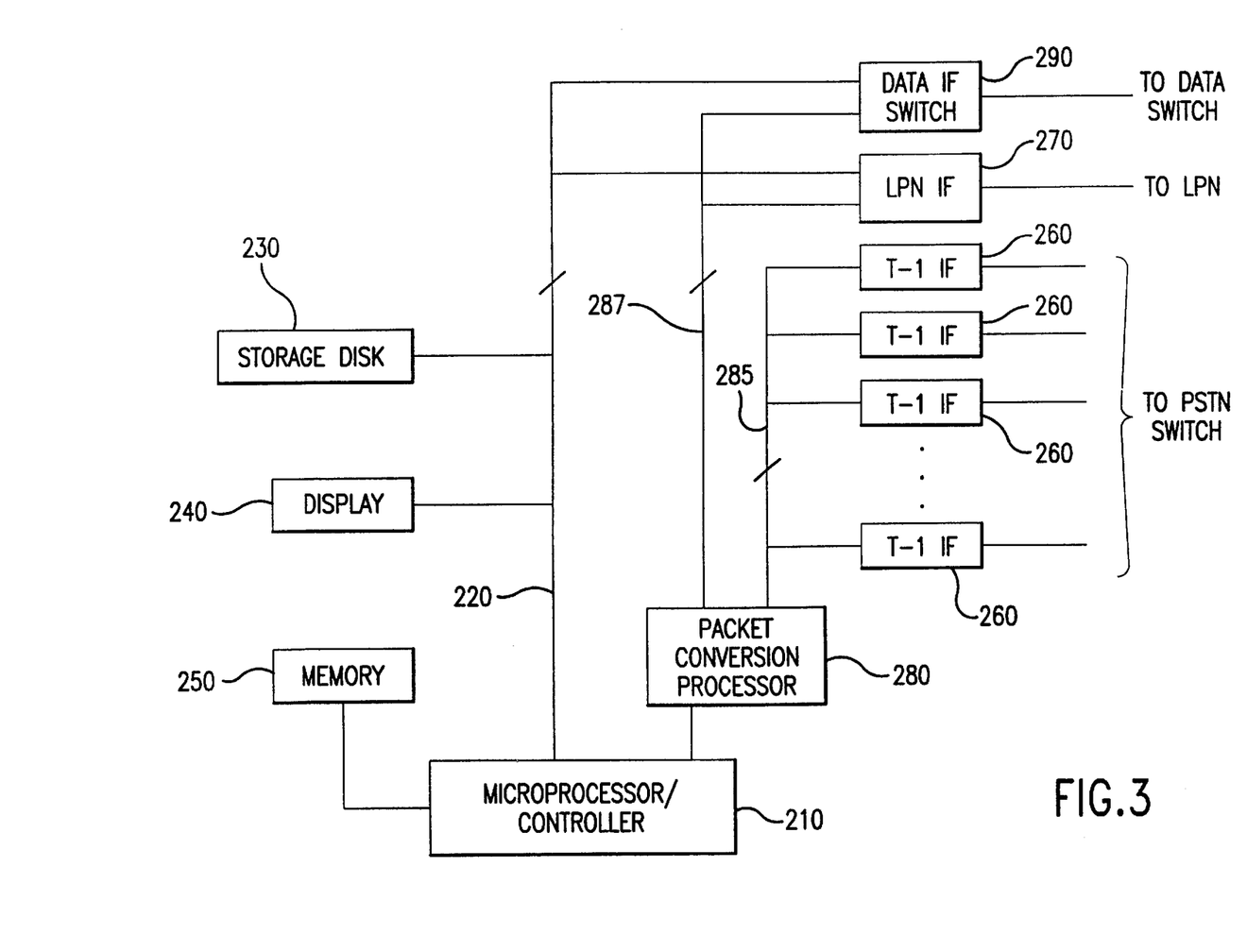
FIG. 3 is a block diagram of a host digital terminal according to the present invention.

Turning to FIG. 3, in conjunction with FIG. 1, the HDT 200 will be described. The HDT 200 performs functions complementary to those performed by the RDT 100. A single HDT 200 can support communication with a plurality of RDTs 100 that are connected to the LPN 60.

In the preferred embodiment, the HDT 200 is implemented in a conventional computer system, with specialized software controlling a set of interface electronics. Specifically, the HDT 200 shown in FIG. 3 comprises a microprocessor-based controller 210, a bus, such as a Peripheral Connection Interface (PCI) bus 220, a storage disk 230, a display 240, and a memory 250, such as SRAM. The HDT 200 interfaces to the PSTN switch 32 by a PSTN interface (IF) device, such as T-1 IFs 260, preferably communicating via the Bellcore GR-303 signaling interface. That is, the T-1 IFs 260 connect to T-1 lines, which are in turn connected to the PSTN switch 32. The HDT 200 interfaces to an optical link connected to the LPN 60 by an LPN IF device 270, such as an OC-3 optical link utilizing the Asynchronous Transfer Mode (ATM). Similarly, a data switch IF device 290 is provided to interface with the data switch 34. PC-cards implementing the functions of the LPN IF device 270 and data switch IF 290 are plugged into the PCI bus 220.

The LPN IF device 270 connects to the LPN 60 via an optical fiber (FIG. 1) and provides a data transfer rate of 155 Mbps in each direction. ATM cells are sent and received over the link, wherein each cell contains address information, including source and destination information, as well as the data to be transferred. Alternatively, the LPN IF device 270 operates at other rates, such as OC-12 at 622 Mbps, Fast Ethernet (100 Mbps) or Gigabit Ethernet (1000 Mbps.) However, the preferred embodiment is the ATM-155 standard.

The T-1 IFs 260 are coupled to a packet conversion processor 280 by a TDM bus 285. Similarly, the data switch IF 290 and LPN IF 270 are coupled to the packet conversion processor 280 by a TDM bus 287. The function of the packet conversion processor 280 is to convert information between different formats used by the devices connected to it. For example, the packet conversion processor 280 converts packets received from the LPN via the LPN IF 270 to a time-divisional multiplexed format for coupling to the T-1 IFs 260. Similarly, the packet conversion processor 280 converts packets received from the LPN IF 270 to a suitable format for coupling to the data switch IF 290. The packet conversion processor 280 performs these conversions in reverse as is appropriate. The packet conversion processor 280 is preferably implemented by an application-specific processor, and its operation is supervised by the microprocessor/controller 210 for call control functions, call setup, system errors and other matters. In some configurations, the function of the packet conversion processor 280 may be included within the functionality of the microprocessor 210.

The T-1 facilities connected to the PSTN switch 32 are logically divided into "time-slots" using time-division multiplexing. Each T-1 line carries 24 time-slots or channels, with each channel carrying a single digitized voice conversation. One or more of the 24 channels is designated a control channel and carries signaling information between the HDT 200 and the attached PSTN switch 32. Use of the control channel is described in more detail hereinafter.

Preferably, the HDT 200 is designed to have a modular architecture that is easily scaleable. The HDT 200 can cost-effectively support as few as 100 end user lines and 24 trunks to the voice switch 32, and up to as many as 6,000 lines and 2,000 trunks. Additional HDTs can be added to handle as many as 100,000 lines or more. The HDT 200 is preferably designed to provide "carrier-class" availability, including redundant and "hot-swappable" components. It is preferably a NEBS level 3 compliant rack-mounted system designed to reside in a central office environment and can be engineered to have N+1 redundancy.

A software program stored in the memory 250 allows the microprocessor 210 to perform the control functions analogous to the call set-up and functions performed by the RDT 100, and to support communication with multiple RDTs 100 simultaneously. As mentioned above, software to carry out the functions of the HDT 200 may be incorporated directly into the PSTN switch 32 or into the data switch 62 such that a separate "box" to carry out the functions of the HDT 200 would not be needed.

The operations of the RDT 100 and HDT 200 are described with reference to FIGS. 4–7, together with FIGS. 1–3. In order to transport voice and data services via the DSL access portion through the LPN 60, the RDT 100 and HDT 200 employ a compatible digital signaling and information transfer protocol. There are many such protocols well known in the art of telecommunications, and it is likely that many new protocols will be created that may be useful in connection with the system and method of the present invention. The ATM protocol is the example of a suitable protocol. The ATM protocol is a format that divides a bandwidth into a plurality of cells each of which may contain voice-band packets, data packets, call control packets, etc.

The local loop link supports in each direction the transport of voice-band packets representing analog voice-band telephone signals, data packets associated with data devices (computers in a LAN) and call control packets. A voice-band packet includes an identifier (source and destination) and the voice-band packet information. A call control packet includes a control flag (identifying it as a control message), a control message (off-hook, busy, etc.) and an identifier associated with the call to which the control message applies. If the ATM protocol is used, each packet occupies an ATM cell. Upon receiving a packet, the RDT 100 and HDT 200 first detect the type of packet received (by a control flag or other identifying information) in order to determine whether the packet represents call control functions, voice-band information or data information. The RDT 100 converts analog telephone signals to and from a suitable digital packet format in order to communicate with the attached analog TDs 10. In addition, if communication with data devices at the customer site is supported and required, the RDT 100 converts data packets from the data devices to and from a suitable packet format for communication via the LPN. Similarly, the HDT 200 converts voice-band information and data packets between different types of digital formats in order to conduct communications via the PSTN switch 32 and the data switch 34.

Figure 4:
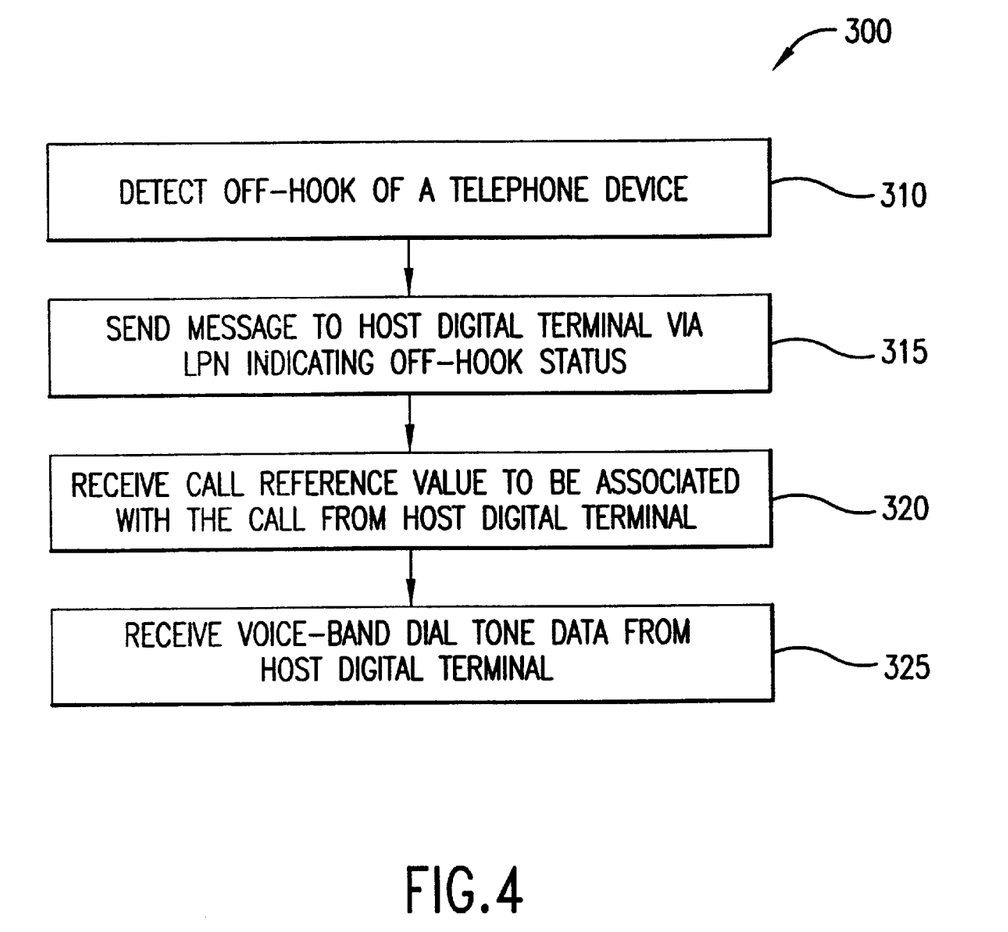
FIG. 4 is a flow chart depicting a call set-up procedure in the remote digital terminal.

Turning to FIG. 4, with reference to FIG. 2, a call-setup procedure 300 in the RDT 100 is described. This procedure occurs when a call is initiated by one of the TDs 10 connected to the RDT 100. In step 310, an SLIC 150 detects that a connected TD 10 is off-hook, and a corresponding signal is coupled to the controller 110. The controller 110, in step 315, generates a control message (formatted into a call control packet) indicating the off-hook status and requesting a dial-tone, that is transmitted to the HDT 200 via the LPN 60. The controller 110, in doing this, first determines whether there is available bandwidth on the DSL 24 based on the number of other voice calls currently being maintained by the RDT 100. If there is available bandwidth, then the message is sent to the HDT 200; otherwise, a "busy" or other signal indicating unavailability is sent to that telephone device.

Next, in step 320, the RDT 100 receives a call control packet from the HDT 200 that includes a call reference value to be associated with that call. In step 325, a call control packet or voice-band packet (depending on the system implementation) representing a voice-band dial-tone is received from the HDT 200 that is converted to a digital bit stream by the RDT 100, converted to an analog dial-tone signal by the CODEC 160 and connected to the TD 10 by the SLIC 150.

Figure 5:
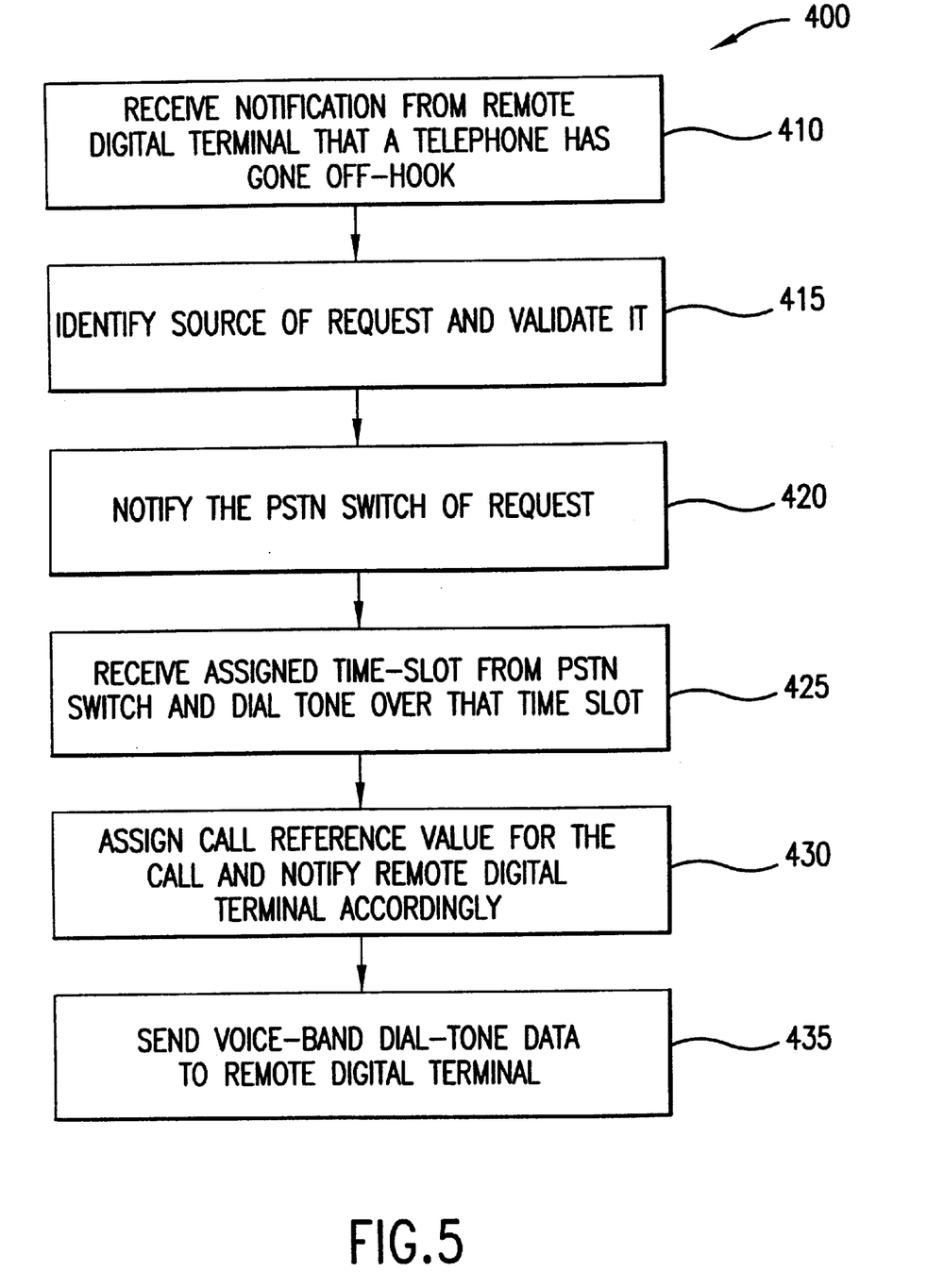
FIG. 5 is a flow chart depicting a call-set up procedure in the host digital terminal.

FIG. 5 illustrates the complementary call set-up procedure 400 in the HDT 200, again, in the case when a call is initiated by a telephone device connected to the RDT 100. The use of the ATM protocol is referred to in the following description as an example of a suitable networking technology used by the LPN. Reference is also made to FIG. 3 in connection with this description. In step 410, the HDT 200 receives the call control packet containing a control message from the RDT 100 indicating that a telephone device has gone off-hook. In step 415, the HDT 200 identifies the source of the call control message by looking at the address provided in the ATM cell containing the call control packet request. It is verified whether the request is valid, i.e., coming from a customer site 7 whose account is active. In step 420, the HDT 200 notifies the PSTN switch 32 via the designated control channel over one of the T-1-IFs 260 of the request. In reply, the PSTN switch 32 assigns an available time-slot for the call on one of the T-1 facilities, and this time-slot information is received by the HDT 200 in step 425, together with a dial-tone over that time-slot. Next, in step 430, the HDT 200 assigns a call reference value for the call and communicates that value in a control message that is transmitted to the RDT 100. Finally, in step 435, the HDT 200 generates voice-band packet(s) representing a dial-tone for the call and transmits it to the RDT 100.

Calls that are initiated by devices on the HDT side of the system are received by the HDT 200 when the PSTN switch 32 detects a match between a received telephone number and a table of telephone numbers assigned to a customer site within the supervisory control of the HDT 200. In response, the HDT 200 transmits to the RDT 100 a call control packet containing a command for a ringing signal that is interpreted by the RDT 100 to generate an analog ringing signal for connection to the appropriate TD 10. A call reference value is assigned, and voice-band packets are exchanged between the HDT 200 and RDT 100 in a manner analogous to that described for a call initiated at the RDT 100. When the addressed telephony device at the RDT 100 goes off-hook, the RDT 100 generates a control packet indicating same, and the HDT 200, upon receipt of that packet, notifies the PSTN switch 32 that the call has been answered. Thereafter, the operation of the RDT 100 and HDT 200 continues as explained below. The communication of a data packet to a data device at the customer site is initiated in an analogous manner when the data switch 34 receives a data packet destined for a data device at the customer site.

It should be understood that the "telephone numbers" associated with the TDs 10 connected to the RDT 100 are managed by the PSTN switch 32 located in the central switching facility 30. When a person somewhere in the PSTN 42 dials a number, such as 404-555-1234, traditional PSTN technology routes that call to the PSTN switch 32, which in turn presents the call information, as described herein, to the HDT 200, for transmission to the RDT 100 and ultimately to the connected TD 10. Thus, the TDs 10 connected to the RDT 100 operate identically to telephone devices connected directly to the central switching facility 30, and can make and receive PSTN telephone calls in the traditional fashion.

Once a call between the RDT 100 and HDT 200 is set up, remaining communication will consist primarily of voice-band packets or data packets depending on the end devices communicating with each other until the call is terminated. In general, only when new calls are initiated, calls are terminated, or system errors occur will call control packets occur over the local loop link.

Figure 6:
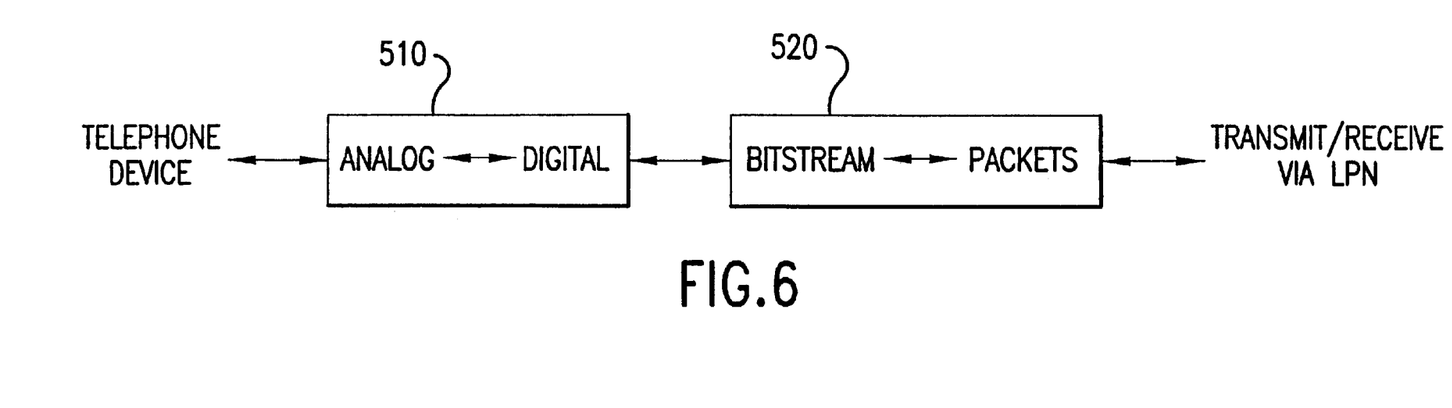
FIG. 6 is a flow chart depicting processing of voice-band data in the remote digital terminal.

The operation of the RDT 100 once a call is set-up is described with reference to FIG. 6, in conjunction with FIGS. 1 and 2. There are two major conversion processes that occur at the RDT 100: analog-to-digital and digital-to-analog conversion shown at step 510, and digital bit stream-to-packet and packet-to-bit stream conversion at step 520. The analog-to-digital (and vice versa) conversion is performed by the CODECs 160 for the analog telephone signals. Some call control related telephone signals are generated by the controller 110 via the SLICs 150. The bit stream-to-packet (and vice versa) conversion is performed by the controller 110.

To explain further, the flow of signals form a TD 10 to the LPN 60 is first described. Analog telephone signals from an attached TD 10 are received and digitized by the attached CODEC 160, creating a digital bit stream representing the real-time analog telephone signals generated by the TD 10. The digital bit stream is placed on the TDM bus 180. In step 520, the digital bit stream is converted into digital packets called voice-band packets. Each voice-band packet contains a plurality of bytes of voice-band information, each representing a sample of the speech (or analog telephone signals) at a predetermined time interval, such as (125) microsec. A single voice-band packet contains a predetermined number of samples of voice information, such as 40, representing 5 msec. of speech, for example. More specifically, the controller 110 accepts 1 byte of digital data from the TDM bus 180 each 125 microsec., and buffers the information in the SRAM 130. When a full packet of voice information is accumulated in the SRAM 130, the controller 110 formats the packet with its associated call reference value and transfers it to the DSL modem 120, causing it to be modulated and transmitted via the LPN 60 to the HDT 200. The controller 110, under control of the software stored in the ROM 140, carries out this process for all calls that are active at the RDT 100. Similarly, when the controller 110 receives data packets via the Ethernet interface 170 from the LAN 12, it buffers them in the SRAM 130 for modulation by the DSL modem 120 and transmission via the LPN 60. Depending on the availability of bandwidth on the DSL 24, the controller 110 may buffer the digital data from the LAN 12 until sufficient bandwidth becomes available, giving prior to the voice-band information.

The controller 110 caries out this process for each of the TDs 10 which is active at any given time, sequencing through each CODEC 160, accumulating a voice-band information for each call, and passing it to the DSL modem 120 for transmission when it is filled. Construction of the packets is skewed by the controller 110 such that all packets are not ready for transmission simultaneously; rather, a packet for a first call is completed, and then the packet for the next call is completed a fraction of a second later, allowing the packet for the first call to be transmitted by the DSL modem 120 so that it is ready to accept the packet for the next call when it is ready. Alternatively, the voice-band data for several calls may be multiplexed together into a single voice-band packet that contains identifiers to each call and data for each call. This alternative technique reduces any potential delay that may occur as a result of the packetizing process.

In the reverse direction, the DSL modem 120 receives modulated voice-band packets and data packets transmitted over the DSL 24 from the central switching facility 30. The DSL modem 120 demodulates the modulated voice-band packets and modulated data packets and couples them to the controller 110. The controller 110 receives the demodulated voice-band packets and data packets, and identifies voice-band packets by the call reference value contained therein. The controller 110 stages the voice-band packets in SRAM 130, queuing subsequent voice-band packets as they are received. Simultaneously, the controller 110 takes individual bytes of data from the SRAM 130 and places them onto the TDM bus 180 at the rate of 1 byte every 125 microsec., for connection to an appropriate one of the CODECs 160 associated with the addressed TD 10. The CODEC 160 converts the digital bit stream data to analog signals telephone which are coupled by the SLIC 150 to the TD 10.

With respect to the received data packets, when the controller 110 detects the reception from the DSL modem 120 of a data packet not associated with telephony functions, it directs it to the Ethernet interface 170 where it is coupled (according to an associated address) to the appropriate data device in the LAN 12.

The RDT 100 sets the priority for utilization of the bandwidth of the local loop link between voice traffic and data traffic. For example, the controller 110 may be programmed to assign priority of use of the local loop link to voice traffic over data traffic. In this case, bandwidth over the DSL connection will be used for voice calls when they are active, but will be available for data traffic when some of the TDs 10 are idle. Typically, the bandwidth of a DSL is as high as 2 Mbps. The controller 110 may designate a portion of that bandwidth for voice traffic, for all or adjustable time periods during a day. Once the data traffic maximum is reached, no further data traffic would be permitted. These traffic parameters are programmable in the RDT 100, and if necessary, can be adjusted in real-time to accommodate sudden bandwidth allocation needs.

Figure 7:
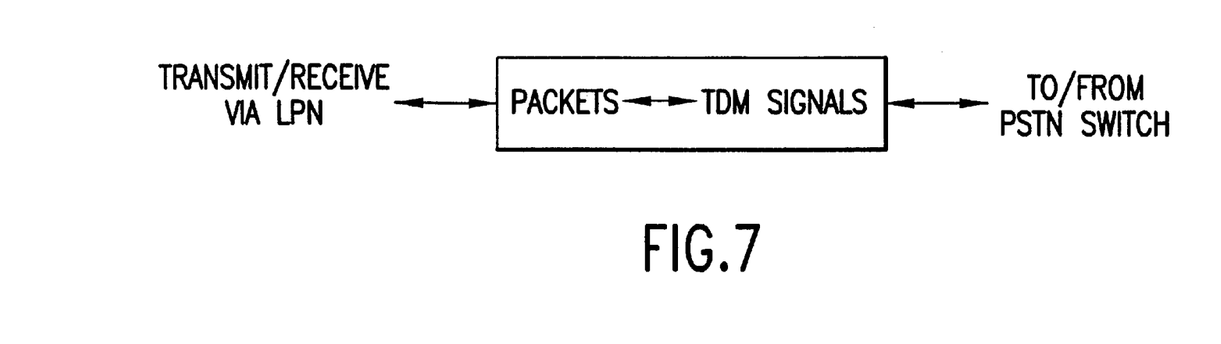
FIG. 7 is a flow chart depicting processing of voice-band data in the host digital terminal.

With reference to FIG. 7, in conjunction with FIGS. 1 and 3, the operation of the HDT 200 in processing ongoing calls is described. Voice-band packets and data packets sent by the RDT 100 via the LPN 60 are received by the LPN IF 270. The packet conversion processor 280 converts the voice-band packets to time-division multiplexed (TDM) signals in a process similar to that in the RDT 100, and couples the TDM signals via a T-1 IF 260 to the PSTN switch 32 in an assigned time-slot. Data packets received from the RDT 100 are (reformatted if required by the packet conversion processor 280 and) coupled to the data switch 34 by the data switch IF 290 under control of the microprocessor 210.

In the reverse direction, the HDT 200 receives TDM signals for a given call from a T-1 IF 260 at a rate of one byte every 125 microsec. In a process similar to that in the RDT 100, the packet conversion processor 280 buffers the bytes of data of the TDM signals in the memory 250 to form voice-band packets, which are then dispatched to the RDT 100 via the LPN IF device 270. Data packets received from the data switch 34 are coupled to the LPN IF device 270 for transmission to the customer site.

The HDT 200 may also be involved in bandwidth usage control. For example, the microprocessor 210 may be programmed to continuously monitor the amount of bandwidth of the local loop link used by a given RDT 100 at customer site for voice traffic to determine remaining bandwidth availability on the local loop link for data traffic. The microprocessor 210 may be programmed to limit data traffic to the customer site from the LPN such that a predetermined portion of the total bandwidth available to the customer site on the local loop link used by that RDT 100 remains available for voice traffic. Furthermore, the microprocessor 210 may be programmed to generate a message to be sent to a data switch 62 in the LPN 60 indicating the amount of bandwidth available for data so that the data switches 62 in the LPN 60 can abide by this rule in transmitting (or not transmitting) data traffic to the HDT 200 destined for a particular RDT 100 at a particular customer site.

In order to be competitive in the local market, CLECs must deliver service that is of the same quality as that which the customer is currently receiving from the ILEC. To achieve this, the system of the present invention digitizes voice conversations using standard "$\mu$-law" encoding (64 Kbps) and need not use voice compression (though compression can be used if it is desired to reduce the bandwidth utilization through the LPN). In addition, to avoid the delays (latency) inherent in some packet networks, the system according to the preferred embodiment uses ATM signaling and is optimized throughout to limit buffer sizes and queues, insuring that voice-band data moves expeditiously between the RDT and HDT.

In summary, the present invention is directed to a method for communicating voice to and from at least one customer site over a local packet network (LPN) supporting a packet-based transport protocol. At a customer site, a plurality of telephone devices are interfaced to a local loop link, such as a DSL or wireless local loop, connected to the LPN. Analog telephone signals received from the plurality of telephone devices are converted to voice-band packets and the voice-band packets are modulated for transmission via the local loop link over the LPN. In the reverse direction, modulated voice-band packets received from the LPN on the local loop link are demodulated. The demodulated voice-band packets are converted to analog telephone signals for connection to appropriate ones of the plurality of telephone devices. In addition to the communication of voice, the method further supports the communication of data to and from data devices (which data devices may be part of a local area network) at the customer site. Data packets from the data devices are modulated and transmitted via the LPN. In the reverse direction, data packets received from the LPN are demodulated and coupled to the data devices (in the local area network) at the customer site.

At a control site within the LPN (such as a data switch in the LPN) or connected to the LPN (such as a HDT or a PSTN switch at a central switching facility), voice-band packets (and optionally data packets) from the customer site are received (via the LPN if the control site is external to the LPN). The voice-band packets received from the customer site via the LPN are converted to time-division multiplexed signals and are coupled to a public switched telephone network (PSTN) voice switch in assigned time slots. Data packets received from the customer site are (reformatted if necessary and) coupled via a data switch to a destination data network, such as data network. In the reverse direction, data packets destined for the customer site are received from a source data network via the data switch connected to the source data network, such as data network. Time-division multiplexed signals received from the PSTN switch destined for the customer site are converted to voice-band packets and are coupled to the LPN 60 for transmission to the customer site. Similarly, data packets received from the source data network via the data switch are coupled to the LPN for transmission to the customer site.

Similarly, the present invention is directed to a system for communicating voice and data over an LPN to and from at least one customer site (usually a plurality of customer sites) connected to the LPN via a local loop link, comprising:

a remote digital terminal at the customer site, the remote digital terminal interfacing a plurality of telephone devices at the customer site to the local loop link to transmit and receive voice via the LPN; and a host digital terminal at a control site within or connected to the LPN that interfaces voice calls between the remote digital terminal and a public switched telephone network (PSTN) switch via the LPN.

The system may support eh further transport of data between data devices (which may be part of a local area network) at the customer site and a data network within the LPN or a data network connected to the host digital terminal. Suitable hardware and the associated control functions required in the remote digital terminal and host digital terminal for transporting voice traffic and data traffic to and from a customer site are described above.

The present invention is further directed to an apparatus for communicating voice and data between a local packet network (LPN) and equipment in a central switching facility having a public switched telephone network (PSTN) switch connected to the PSTN and a data switch connected to a data network. The apparatus comprises an LPN interface device connected to the LPN to interface voice-band packets and data packets to and from the LPN; a PSTN interface device connected to the PSTN switch to interface signals to and from the PSTN switch; a packet conversion processor coupled to the LPN interface device and to the PSTN interface device that converts voice-band packets between a format suitable for transit via the LPN and a time-division multiplexed signal format suitable for coupling to the PSTN switch; and a controller. The controller is coupled to the LPN interface device, to the packet conversion processor and to the PSTN interface device, and manages the interface of voice-band packets between the LPN and the PSTN switch.

The apparatus further supports the communication of data and comprises a data switch interface device connected to a data switch at the central switching facility and to the packet conversion processor. The packet conversion processor converts data packets between a format suitable for transit via the LPN and a format suitable for coupling to the data switch. The controller of the host digital terminal is connected to the data switch interface device and controls the communication of data packets received from the remote digital terminal by the LPN interface device to the data switch interface device and communication of data packets received from the data switch by the data switch interface device destined for the customer site to the LPN interface device for transmission via the LPN.

Furthermore, the present invention is directed to a method for communicating voice and data to and from a customer site over a local packet network (LPN), the customer site being connected to the LPN via a local loop link. The method comprises steps of:

receiving voice-band packets at a control site from the customer site via the LPN;

converting the voice-band packets received from the LPN to time-division multiplexed signals;

coupling the time-division multiplex signals in assigned time-slots to a PSTN switch; and converting time-division multiplexed signals received from the PSTN switch destined for the customer site to voice-band packets and coupling the voice-band packets to the LPN for transmission to the customer site.

The method further supports the communication of data by coupling data packets received at the control site from the customer site via the LPN to a data network within or without the LPN; and coupling data packets received from the data network destined for the customer site to the LPN for transmission to the customer site.

The above description is intended by way of example only and is not intended to limit the present invention in any way except as set forth in the following claims.

What is claimed is:

1. A system for communicating voice and data over a local packet network (LPN) to and from at least one customer site connected to the LPN via a local loop link, comprising:

a remote digital terminal at the customer site, the remote digital terminal interfacing a plurality of telephone devices at the customer site to the local loop link to transmit and receive voice via the LPN, wherein the remote digital terminal comprises:

a modem for connection to the local loop link to modulate information for transmission over the LPN and to demodulate information received from the LPN;

a plurality of subscriber line interface circuits each suitable for connection to a telephone device;

a plurality of coder/decoders each for connection to a subscriber line interface circuit, each coder/decoder capable of converting analog telephone signals received from an associated subscriber line interface circuit to digital bit streams and converting a digital bit stream to analog telephone signals to be supplied to the associated subscriber line interface circuit;

a network interface device for connection to a local area network of data devices at the customer site to couple data packets from the local area network for transmission over the LPN and to couple data packets received from the LPN to the local area network;

a controller coupled to the modem, to the coder/decoders, to the network interface device and to the subscriber line interface circuits, the controller coupling data packets from the network interface device to the modem for transmission on the local loop link to the LPN and coupling demodulated data packets received from the modem to the network interface device, and the controller managing the interface of voice-band packets between the LPN and the customer site by:

converting digital bit streams received from one or more coder/decoders to voice-band packets and coupling the voice-band packets to the modem for transmission on the local loop link to the LPN; and converting demodulated voice-band packets received via the modem from the LPN to digital bit streams and coupling the digital bit streams to an appropriate one of the coder/decoders; and a host digital terminal at a control site within or connected to the LPN that interfaces voice calls between the remote digital terminal and a public switched telephone network (PSTN) switch via the LPN.

2. The system of claim 1, wherein the local loop link supports a Digital Subscriber Line (DSL) and its associated transport protocols, and wherein the modem comprises a DSL modem.

3. The system of claim 1, wherein the local loop link supports a wireless transport protocol, and wherein the modem comprises a wireless modem.

4. The system of claim 1, wherein the controller of the remote digital terminal assigns priority of use of a bandwidth of the local loop link between voice traffic and data traffic.

5. The system of claim 4, wherein the controller of the remote digital terminal assigns priority of use of the bandwidth of the local loop link to voice traffic over data traffic.

6. The system of claim 1, wherein the host digital terminal comprises:

an LPN interface device for connection to the LPN to receive and transmit packets via the LPN;

at least one PSTN interface device for coupling signals to and receiving signals from the PSTN switch;

a packet conversion processor coupled to the LPN interface device and to the PSTN interface device, the packet conversion processor converting voice-band packets between a format suitable for transit via the LPN and a time-division multiplexed signal format suitable for coupling to the PSTN switch; and a controller coupled to the PSTN interface device, to the packet conversion processor and to the LPN interface device, the controller managing the interface of voice-band packets between the LPN and PSTN switch.

7. The system of claim 6, wherein the host digital terminal further comprises a data switch interface device for interfacing data packets between the host digital terminal and a data switch connected to a data network, the data switch interface device being connected to the packet conversion processor, the packet conversion processor converts data packets between a format suitable for transit via the LPN and a format suitable for coupling to the data switch, the controller of the host digital terminal being connected to the data switch interface device and controlling the communication of data packets received from the remote digital terminal by the LPN interface device to the data switch interface device and communication of data packets received from the data switch by the data switch interface device destined for the customer site to the LPN interface device for transmission via the LPN to the remote digital terminal.

8. The system of claim 7, wherein the controller of the host digital terminal continuously monitors the amount of bandwidth used by the remote digital terminal for voice traffic to determine remaining bandwidth availability on the local loop link for data traffic, and limits data traffic destined for the customer site such that a predetermined portion of the total bandwidth available to the customer site remains available for voice traffic.

9. The system of claim 6, wherein the controller of the host digital terminal continuously monitors the amount of bandwidth used by the remote digital terminal for voice traffic to determine remaining bandwidth availability on the local loop link for data traffic, and wherein the controller of the host digital terminal sends a message to a data switch in the LPN indicating the amount of bandwidth available for data on the local loop link.

10. The system of claim 6, wherein the LPN interface device is an optical device implementing an asynchronous transfer mode (ATM) protocol.

11. The system of claim 6, wherein the PSTN interface device comprises a plurality of T-1 interfaces.

12. A method for communicating voice and data to and from at least one customer site over a local packet network (LPN) supporting a packet-based transport protocol, each customer site comprising a plurality of telephone devices and at least one data device, the method comprising steps of:

at a customer site:

converting analog telephone signals received from the plurality of telephone devices to voice-band packets and modulating the voice-band packets for transmission over the LPN via a local loop link between the customer site and the LPN;

demodulating modulated voice-band packets received from the LPN on the local loop link;

converting the demodulated voice-band packets to analog telephone signals for connection to appropriate ones of the plurality of telephone devices;

modulating data packets received from the at least one data device at the customer site for transmission over the LPN via the local loop link; and demodulating modulated data packets received from the LPN on the local loop link and coupling the data packets to the at least one data device at the customer site;

at a control site within or connected to the LPN:

receiving voice-band packets from the customer site via the LPN;

converting voice-band packets received from the customer site to time-division multiplexed signals and coupling the time-division multiplexed signals to a public switched telephone network (PSTN) switch; and converting time-division multiplexed signals received from the PSTN switch destined for the customer site to voice-band packets and coupling the voice-band packets to the LPN for transmission to the customer site.

13. The method of claim 12, wherein at the control site, further comprising steps of:

receiving modulated data packets from the customer site via the LPN and coupling the modulated data packets to a destination data network via a data switch; and receiving data packets destined for the customer site from a source data network via the data switch and coupling the data packets received from the data switch to the LPN for transmission to the customer site.

14. The method of claim 13, wherein at the customer site, further comprising the step of assigning priority of use of a bandwidth of the local loop link between voice traffic and data traffic.

15. The method of claim 14, wherein the step of assigning comprises assigning priority of use of the bandwidth of the local loop link to voice traffic over data traffic.

16. The method of claim 13, wherein at the control site, further comprising the steps of:

continuously monitoring the amount of bandwidth of the local loop link used by the customer site for voice traffic to determine remaining bandwidth availability on the local loop link for data traffic; and limiting data traffic to the customer site from the LPN such that a predetermined portion of the total bandwidth available to the customer site on the local loop link remains available for voice traffic.

17. The method of claim 13, wherein at the control site, further comprising the steps of:

continuously monitoring the amount of bandwidth of the local loop link used by the customer site for voice traffic to determine remaining bandwidth availability on the local loop link for data traffic;

sending a message to the data switch in the LPN indicating the amount of bandwidth available for data traffic destined for the customer site.

18. The method of claim 12, wherein the functions specified for the control site are performed by a data switch that is part of the LPN.

19. The method of claim 12, wherein the functions specified for the control site are performed by the PSTN switch in a central switching facility.

20. The method of claim 12, and wherein the functions specified for the control site are performed by a host digital terminal that connects to the PSTN switch at a central switching facility.

21. The method of claim 12, wherein the local loop link supports a Digital Subscriber Line (DSL) and its associated transport protocols.

22. The method of claim 12, wherein the local loop link supports a wireless packet-based transport protocol.

23. An apparatus for communicating voice and data between a local packet network (LPN) and equipment in a central switching facility comprising a public switched telephone network (PSTN) switch connected to the PSTN, the apparatus comprising:

an LPN interface device connected to the LPN to interface voice-band packets to and from the LPN;

a PSTN interface device connected to the PSTN switch to interface signals to and from the PSTN switch;

a data switch interface device connected to a data switch at the central switching facility;

a packet conversion processor coupled to the LPN interface device, to the data switch interface device and to the PSTN interface device, the packet conversion processor converting voice-band packets between a format suitable for transit via the LPN and a time-division multiplexed signal format suitable for coupling to the PSTN switch, and the packet conversion processor converting data packets between a format suitable for transit via the LPN and a format suitable for coupling to the data switch; and a controller coupled to the LPN interface device, to the packet conversion processor, to the data switch interface device and to the PSTN interface device, the controller managing the interface of voice-band packets between the LPN and the PSTN switch, the controller controlling the communication of data packets received from the remote digital terminal by the LPN interface device to the data switch interface device and communication of data packets received from the data switch by the data switch interface device destined for the customer site to the LPN interface device for transmission via the LPN, wherein the controller continuously monitors the amount of bandwidth of a local loop link used by a customer site for voice traffic to determine remaining bandwidth availability on the local loop link for data traffic, and limits data traffic destined for the customer site from the LPN such that a predetermined portion of the total bandwidth available to the customer site on the local loop link remains available for voice traffic.

24. An apparatus for communicating voice between a local packet network (LPN) and equipment in a central switching facility comprising a public switched telephone network (PSTN) switch connected to the PSTN, the apparatus comprising:

an LPN interface device connected to the LPN to interface voice-band packets to and from the LPN;

a PSTN interface device connected to the PSTN switch to interface signals to and from the PSTN switch;

a packet conversion processor coupled to the LPN interface device and to the PSTN interface device, the packet conversion processor converting voice-band packets between a format suitable for transit via the LPN and a time-division multiplexed signal format suitable for coupling to the PSTN switch; and a controller coupled to the LPN interface device, to the packet conversion processor and to the PSTN interface device, the controller managing the interface of voice-band packets between the LPN and the PSTN switch, wherein the controller continuously monitors the amount of bandwidth of a local loop link used by a customer site for voice traffic to determine remaining bandwidth availability on the local loop link for data traffic, and generates a message that is sent via a data switch in the central switching facility to the LPN indicating the amount of bandwidth available on the local loop link for data traffic destined for the customer site.

25. In a system for communicating voice and data to and from a customer site over a local packet network (LPN), the customer site being connected to the LPN via a local loop link, at a control site within or connected to the LPN, a method comprising steps of:

receiving voice-band packets at a control site from the customer site via the LPN;

converting the voice-band packets received from the LPN to time-division multiplexed signals;

coupling the time-division multiplex signals in assigned time-slots to a PSTN switch;

converting time-division multiplexed signals received from the PSTN switch destined for the customer site to voice-band packets and coupling the voice-band packets to the LPN for transmission to the customer site;

coupling data packets received at the control site from the customer site via the LPN to a data network within or without the LPN;

coupling data packets received from the data network destined for the customer site to the LPN for transmission to the customer site;

continuously monitoring the amount of bandwidth on the local loop link used by the customer site for voice traffic to determine remaining bandwidth availability on the local loop link for data traffic; and limiting data traffic destined for the customer site from the LPN such that a predetermined portion of the total bandwidth available to the customer site on the local loop link remains available for voice traffic.

26. In a system for communicating voice and data to and from a customer site over a local packet network (LPN), the customer site being connected to the LPN via a local loop link, at a control site within or connected to the LPN, a method comprising steps of:

receiving voice-band packets at a control site from the customer site via the LPN;

converting the voice-band packets received from the LPN to time-division multiplexed signals;

coupling the time-division multiplex signals in assigned time-slots to a PSTN switch;

converting time-division multiplexed signals received from the PSTN switch destined for the customer site to voice-band packets and coupling the voice-band packets to the LPN for transmission to the customer site;

continuously monitoring the amount of bandwidth on the local loop link used by the customer site for voice traffic to determine remaining bandwidth availability on the local loop link for data traffic; and sending a message to the LPN indicating the amount of bandwidth available for data traffic destined for the customer site.

* * * * *